(12) United States Patent
Roig Borrell

(10) Patent No.: US 9,113,656 B2
(45) Date of Patent: Aug. 25, 2015

(54) DEVICE FOR REGULATING AND ADJUSTING THE POSITION OF ROLLERS IN PEELING AND RE-PEELING MACHINES FOR ALMONDS AND SIMILAR DRIED FRUITS

(71) Applicant: Jose Vicente Roig Borrell, Denia (ES)

(72) Inventor: Jose Vicente Roig Borrell, Denia (ES)

(73) Assignee: Jose Borrell S.A. (ES)

( * ) Notice: Subject to any disclaimer, the term of this patent is extended or adjusted under 35 U.S.C. 154(b) by 322 days.

(21) Appl. No.: 13/679,584

(22) Filed: Nov. 16, 2012

(65) Prior Publication Data

US 2013/0133529 A1 May 30, 2013

(30) Foreign Application Priority Data

Nov. 24, 2011 (ES) ................ 201101133 U

(51) Int. Cl.
  *A23N 5/00* (2006.01)
  *A23N 7/00* (2006.01)
  *B02B 3/04* (2006.01)
  *A23N 7/10* (2006.01)

(52) U.S. Cl.
  CPC .............. *A23N 5/008* (2013.01); *A23N 5/002* (2013.01); *A23N 7/10* (2013.01); *B02B 3/045* (2013.01)

(58) Field of Classification Search
  CPC ...... B02B 3/045; A23N 5/002; A23N 5/0087; A23N 7/00; A23N 7/10
  USPC .......... 99/619, 618, 585, 628, 579, 624, 625, 99/640; 209/673, 671, 668; 100/168, 100/155 R
  See application file for complete search history.

(56) References Cited

U.S. PATENT DOCUMENTS

| 3,835,766 | A | * | 9/1974 | Satake | 99/618 |
| 4,034,665 | A | * | 7/1977 | McFarland et al. | 99/574 |
| 4,140,285 | A | * | 2/1979 | Linzberger et al. | 241/232 |
| 4,377,110 | A | * | 3/1983 | Matsumoto | 99/489 |
| 4,389,927 | A | * | 6/1983 | Crompton | 99/575 |
| 5,231,924 | A | * | 8/1993 | Schneid | 100/163 A |
| 5,674,543 | A | * | 10/1997 | Partida | 425/367 |
| 6,513,424 | B1 | * | 2/2003 | Iwasaki et al. | 100/40 |
| 8,465,013 | B2 | * | 6/2013 | Ashikawa | 271/3.18 |

FOREIGN PATENT DOCUMENTS

ES   2342651  A1   7/2010

* cited by examiner

*Primary Examiner* — Reginald L Alexander
(74) *Attorney, Agent, or Firm* — St. Onge Steward Johnston & Reens LLC

(57) ABSTRACT

A device for regulating and adjusting a distance between pairs of adjacent rollers in a peeling machine for almonds and similar dried fruits is provided, wherein the rollers are horizontally aligned at both sides of a central plane through which the product to be peeled is passed, the device including a movement transmission shaft coupled to each pair of adjacent rollers, a motor for operation of the movement transmission shaft, wherein the motor is coupled to one of the ends of the transmission shaft, a torque meter for measuring torque at various positions of the rollers, wherein the torque meter is coupled to a spin axis of at least one of the rollers in the pair, and a sensor for measuring and regulating a working distance between the rollers, wherein the sensor is coupled to at least the other roller in the pair.

10 Claims, 2 Drawing Sheets

DEVICE FOR REGULATING AND ADJUSTING THE POSITION OF ROLLERS IN PEELING AND RE-PEELING MACHINES FOR ALMONDS AND SIMILAR DRIED FRUITS

FIELD OF THE INVENTION

This invention relates to a device for the regulation and adjustment of the position of the rollers of peeling and re-peeling machines for almonds and similar dried fruits, which provides essential novel characteristics and remarkable advantages as compared to the known devices used for the same purposes in the current state of the art.

In particular, the device of the present invention makes it possible to maintain pairs of rollers that apply the necessary surface friction to the almond or other dried fruit for peeling and re-peeling operation, wherein the rollers are maintained in positions mutually separated from each other by a certain working distance determined by an optimum value of a parameter, such as a torque or another similar parameter, being the control operation enhanced through the mutual approach or distancing of the pair of rollers through the action of a motor that acts on a transmission shaft, such as a leadscrew or a similar device, to which said rollers are coupled.

The application field of the present invention is mainly within the industrial sector engaged in the manufacture of processing machines for almonds and other similar dried fruits.

BACKGROUND OF THE INVENTION

In the current state of the art, there are several machines devoted to an extensive range of operations involved in the various processes related to handling and processing of almonds and other similar dried fruit. More specifically, peeling machines are designed for peeling and re-peeling of almonds, in which almonds, after being peeled and conditioned, follow a pre-determined course inside the machine to be subjected to some type of superficial friction. The friction determines the peeling of the nut skin and the collection of the skin in appropriate containers, which typically attract the skin due to a current of air or a similar procedure.

One of such known almond peeling devices is described in ES 200902283. This patent describes a peeling machine in which the skin peeling function is implemented by means of one or more pairs of rollers, which are vertically overlapping, each pair having an adjustable separation, which determine as a whole a central vertical plane for dropping almonds between the rollers. The sliding effect implemented by the rollers on the surface of almonds due to the difference in the rotating speed of each pair the rollers determines the peeling of the skin. The distance between rollers may vary, and, for that purpose, the machine has a hand wheel, which through a shaft or lead screw causes the rollers of each pair to come closer or further away from each other.

The machine described in ES 200902283 provided a substantial improvement over the nut peeling devices known in the art at that time. However, although this known peeling machine fully complies with the purpose for which it has been developed, it still suffers from a number of disadvantages. For example, the friction of the rollers on the almonds causes the manufacture material to wear out with time. Additionally, although this known machine includes detectors of such wear, another disadvantage is that the adjustment of the distance between the pressing rollers must be done manually with the help of an external wheel for each pair of rollers.

Therefore, the functional and productive characteristics of the machine described in ES 200902283 may be improved by providing a device that enables a precise adjustment of the working distance between the rollers in the operational range, which may be substantially small, preferably only a few millimeters, and more preferably around 4 mm. For this reason, given the small margin of the working range, a precise positional adjustment of the rollers is required, because a small variation due to the wear of the device or any other circumstance may have a considerable influence on the quality and/or efficiency of the peeling process.

SUMMARY OF THE INVENTION

Therefore, one of the objectives of the present invention is to provide a device for the regulation and adjustment of the position of the rollers of peeling and re-peeling machines for almonds and similar dried fruit, with permanent and automatic action, to provide a solution to the disadvantages of the above-mentioned prior art devices.

In order to achieve this and other objectives, the device of the present invention facilitates a direct intervention on the pairs of rollers for their positional adjustment. In other words, the device of the present invention regulates the distance or separation between the rollers to achieve the appropriate frictional effect from the pressure exerted by the rollers on the surface of almonds or other dried fruit that passes between the rollers. This effect is controlled by a measurement of a parameter linked to the exerted pressure, giving preference to the measurement of the pair of rollers to keep it in the established value. The control of this established value is carried out by means of the device of this invention, which enables a mutual approach or separation of the rollers of each pair.

To achieve the above mentioned objectives, the device of the present invention includes a transmission shaft, such as a lead screw or a similar device, coupled to a pair of rollers through reversely threaded couplings or another suitable type of coupling. The transmission shaft functions to adjust the approach or separation between the rollers, and is operated from one of the ends by a motor.

The device of the present invention further includes a measurement device coupled to at least one of the rollers that measures distance between the rollers and provides information about the position of the relevant roller to automatically determine the working distance according to the measured value of the working parameter, such as torque, as discussed above. The measurement of this parameter may be carried out by following any one of the sequences that are described in more detail below.

BRIEF DESCRIPTION OF THE DRAWINGS

The characteristics of the invention and other advantages of it will be more clearly explained thanks to the detailed description that follows of a preferred form, provided only for illustration purposes, in relation to the drawings attached, in which.

DETAILED DESCRIPTION OF THE INVENTION

The detailed description of the present invention is provided below with the help of the attached drawings, through which the same numerical references applied to the same or equivalent parts will be used.

Figure 1:
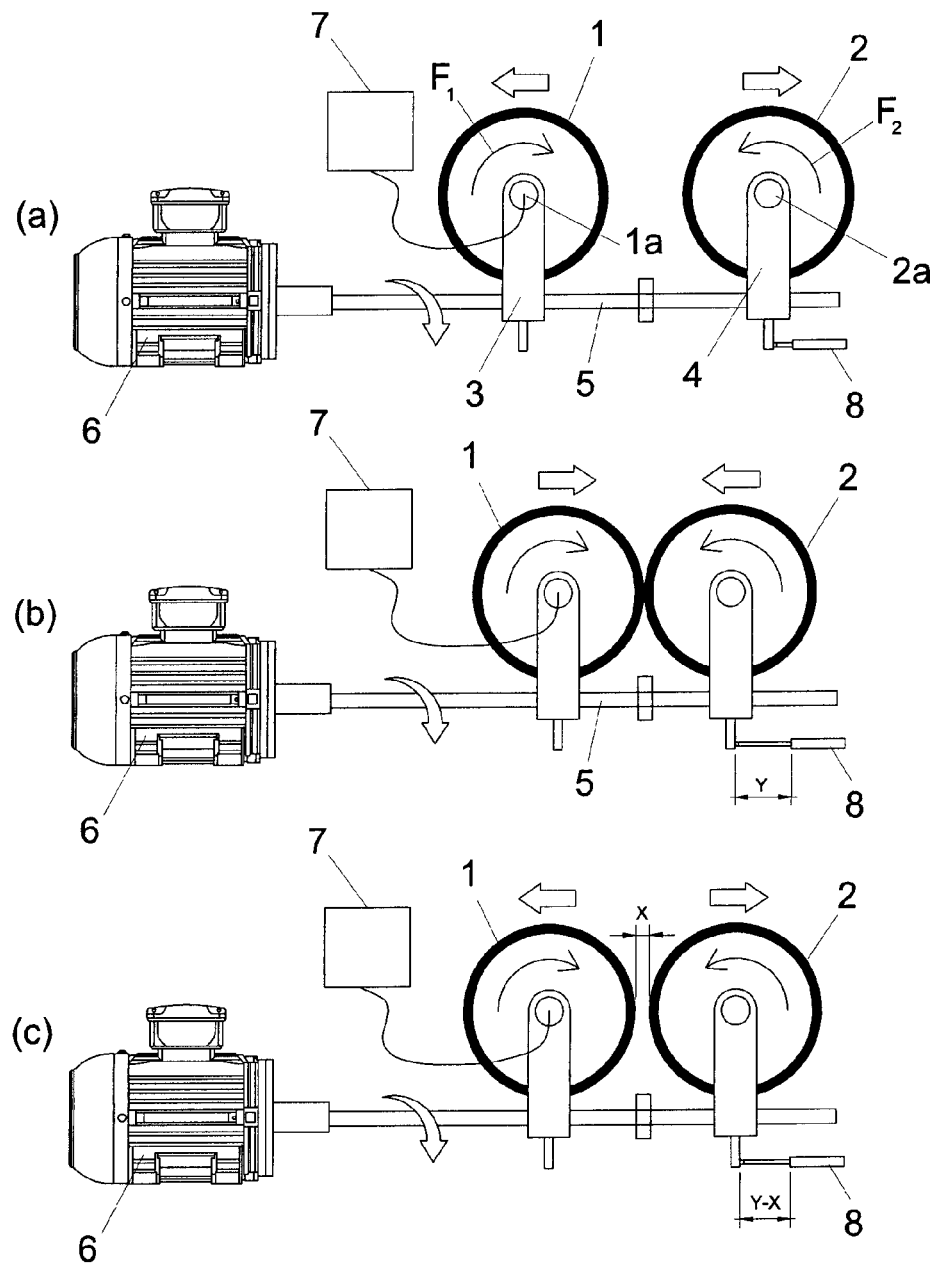
FIG. 1 is a schematic view of the device of the present invention in accordance with a first operational sequence (a) to (c) for determination of an operational control parameter.

FIG. 1 illustrates the peeling or re-peeling machine of almonds of the present invention. The machine includes two rollers (1 and 2) arranged in adjacent positions and horizontally aligned. Each of the rollers (1, 2) is positioned on a bracket (3, 4 respectively). The rollers (1, 2) rotate in opposite directions as indicated by $F_1$ and $F_2$ and at different speeds, as described above, in relation to respective shafts (1a, 2a). The brackets (3, 4) can be shifted relative to a central plane for dropping the almonds to move towards or away from each other in order to regulate a distance "X" between the rollers (1, 2) as shown in view (c). To achieve this, both brackets (3, 4) are operated by a transmission shaft (5), which is in turn operated by a motor device (6), such as an electric motor, coupled to one of the ends of the transmission shaft (5).

In one advantageous embodiment, the transmission shaft (5) comprises a lead screw and a link between the brackets (3, 4) of the rollers (1, 2). The shaft is operated via conventional threaded couplings (not shown), with reverse screw directions. At least one of the spin axes of the rollers, for instance, the axis of the roller (1), may be coupled to a torque meter, and at least the bracket of the other roller has a positional detector (8) that functions to determine the distance "X" between the rollers (1, 2).

According to the embodiment shown in FIG. 1, the appropriate distance between the rollers (1 and 2) may be established based on a certain parameter, such as the torque. It is understood that the distance between the rollers may also be measured based on other parameters, including, but not limited to, strength, power, etc.

FIG. 1 shows an operational sequence through which the selected parameter, in this case the torque, can be determined and through which the separation "X" between the rollers is kept controlled at all times.

At stage (a), the rollers (1, 2) are separated without any interaction between them, which allows for measurement of load torque (M1) via a torque meter (7).

Next, at stage (b), the motor (6) is activated by rotating the transmission shaft (5) to move the rollers (1, 2) towards each other to establish contact between them (with halted rollers). The rollers (1, 2) are pressed together until the torque reaches a pre-determined value (M1+Z), which is then used as a point of origin for subsequent measurements.

Finally, at stage (c), the motor (6) is operated in an opposite direction to move the rollers (1, 2) apart from each other until the rollers are separated by the distance "X" established as a working distance. Once the distance "X" is reached, a working torque (MT) is determined using a torque meter (7). A component (8) acts as a measuring device for measurement of variable distance (Y-X). The component (8) transmits information about a position of the roller (2), such that a varied position of the roller (2), for example due to wear, may be adjusted according to the measured values of the selected parameter (torque) to keep the selected torque value constant.

Figure 2:
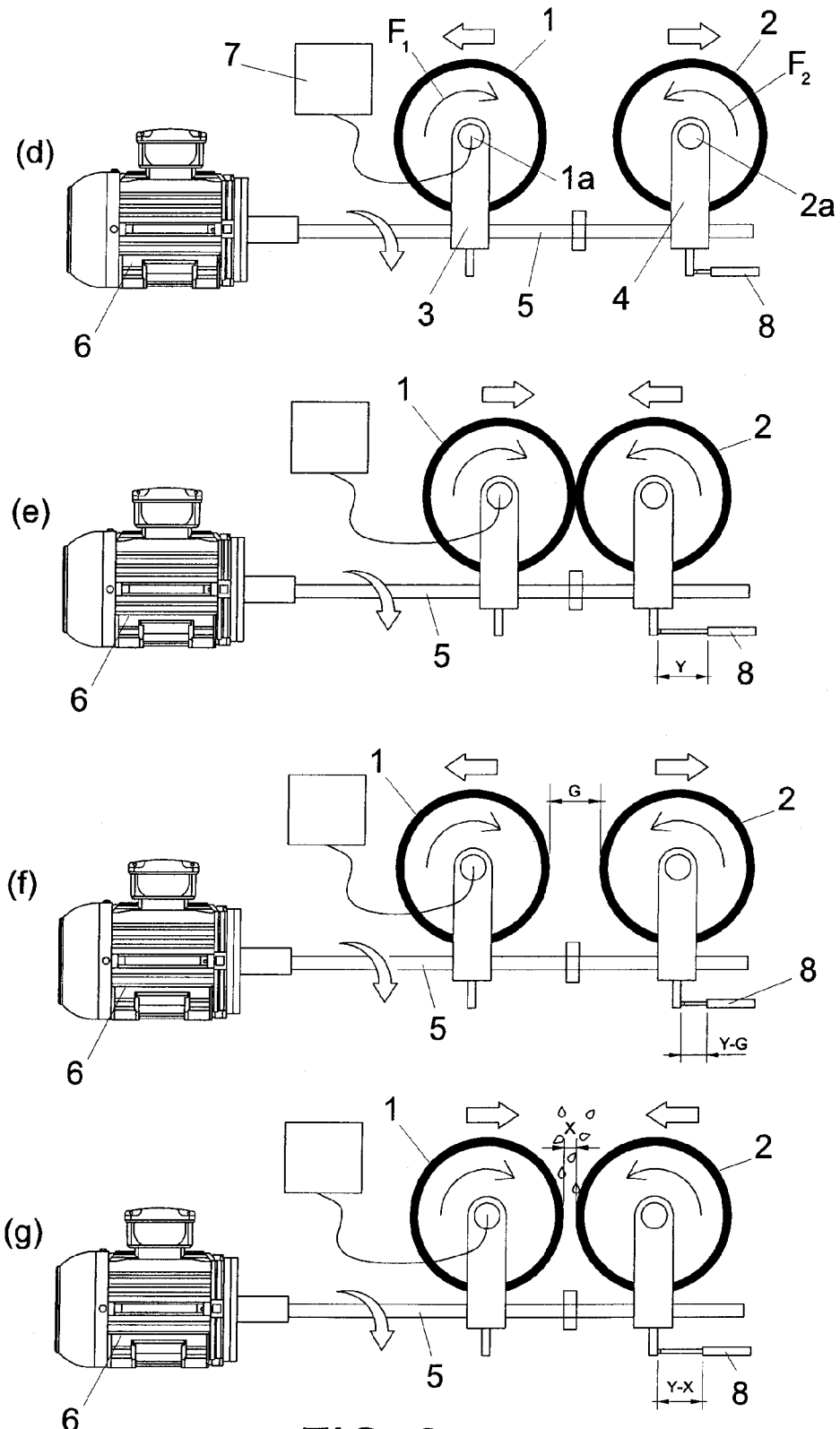
FIG. 2 is a schematic view of the same device as shown in FIG. 1, but following a second operational sequence (d) to (g) for determination of the control parameter.

FIG. 2 illustrates the same operational principle of the machine of the present invention, but the sequence followed for the purpose of regulation and determination of the torque as control parameter is varied slightly in comparison with the sequence shown in FIG. 1.

As shown in this figure, at stage (d), vacuum torque (M1) is measured by a torque meter (7) at a position wherein the rollers (1, 2) are separated with no contact between them.

Then, at stage (e), the motor (6) is activated to rotate the transmission shaft (5) in the direction of approach of the rollers (1, 2) towards each other until they come into contact and press against each other until the torque reaches a pre-determined value (M1+Z), which will be used as a point of origin of the control operations.

At stage (f), the motor (6) is activated in the opposite direction to rotate the transmission shaft (5) in the direction of separation of the rollers (1, 2) until a distance "G" between the rollers is reached, at which the measured torque is again M1 and a distance marked by the sensor component (8) is Y-G, "Y" being an extension of the component (8) at the stage (e), in which the rollers are in contact and the point of origin torque value is determined.

Finally, at stage (g), the motor (6) is activated again to rotate the transmission shaft (5) such as to cause the rollers (1, 2) to move towards each other again until a working distance "X" is reached while the product, such as almonds or other dried fruit, is passed between the rollers. The optimal working distance "X" is established according to the torque value (MT). Again, the sensor component (8) measures the variable distance Y-X to make the roller (2) advance or retreat until the optimal torque value is reached.

The distance meter (8) may be any suitable meter known in the art, such as, for example, linear position sensor (LVDT), laser sensor, ultrasound sensor, potentiometer, or any other similar mechanism.

It is understood that, in other advantageous embodiments, the mechanism may be based on the motor (6) which acts on the transmission shaft (5) at a speed sufficiently low to determine the approximate distance between the rollers (1, 2) based on the wear of the rollers (1, 2) depending on the material with which they were manufactured. This information may be obtained based on comparative graphs comparing strength and displacement of the whole mechanism, taking as a point of origin the position in which the rollers (1, 2) may freely rotate.

It is not considered necessary to extend the content of this description any further for an expert to understand its scope and the advantages derived from it, and to carry out the practical performance of its purpose.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A device for regulating and adjusting a position of rollers in a peeling machine for almonds and similar dried fruits, comprising:
   a pair of adjacent rollers, wherein the rollers are horizontally aligned at both sides of a central plane through which the product to be peeled is passed;
   a movement transmission shaft coupled to the pair of adjacent rollers;
   a motor for operation of said movement transmission shaft, wherein the motor is coupled to one of the ends of the transmission shaft;
   a torque meter for measuring torque at various positions of the rollers, wherein said torque meter is coupled to a spin axis of at least a first of the rollers in the pair; and
   a sensor for measuring and regulating a working distance between the rollers, wherein the sensor is coupled to at least a second of the rollers in the pair and the working distance is regulated based on a value measured by said torque meter.

2. The device according to claim 1, wherein the sensor is selected from the group consisting of linear position sensor, laser sensor, ultrasound sensor, and potentiometer.

3. The device according to claim 1, wherein the movement transmission shaft comprises a threaded lead screw.

4. The device according to claim 3, wherein the movement transmission shaft is coupled to the pair of adjacent rollers via couplings with reverse threading.

5. The device according to claim 1 wherein operation of the motor moves both rollers in the pair of adjacent rollers.

6. The device according to claim 5, wherein the sensor is selected from the group consisting of linear position sensor, laser sensor, ultrasound sensor, and potentiometer.

7. The device according to claim 5, wherein the movement transmission shaft comprises a threaded lead screw.

8. The device according to claim 6, wherein the movement transmission shaft is coupled to the pair of adjacent rollers via couplings with reverse threading.

9. The device according to claim 1 wherein operation of the motor moves both rollers in the pair of adjacent rollers.

10. A device for regulating and adjusting a position of rollers in a peeling machine for almonds and similar dried fruits, comprising:
- a pair of adjacent rollers, wherein the rollers are horizontally aligned at both sides of a central plane through which the product to be peeled is passed;
- a movement transmission shaft coupled to the pair of adjacent rollers;
- a motor for operation of said movement transmission shaft, wherein the motor is coupled to one of the ends of the transmission shaft;
- a torque meter for measuring torque at various positions of the rollers, wherein said torque meter is coupled to a spin axis of at least a one of the rollers in the pair; and
- a sensor for measuring and regulating a working distance between the rollers, wherein the sensor is coupled to at least one of the rollers in the pair and the working distance is regulated based on a value measured by said torque meter.

* * * * *